(12) United States Patent
Chao et al.

(10) Patent No.: US 12,303,081 B2
(45) Date of Patent: May 20, 2025

(54) SELF-PROPELLED DEVICE

(71) Applicant: HOBOT TECHNOLOGY INC., Hsinchu County (TW)

(72) Inventors: Chi Mou Chao, Hsinchu County (TW); Hsin-Hui Wu, Hsinchu County (TW)

(73) Assignee: HOBOT TECHNOLOGY INC., Hsinchu County (TW)

( * ) Notice: Subject to any disclaimer, the term of this patent is extended or adjusted under 35 U.S.C. 154(b) by 1070 days.

(21) Appl. No.: 17/203,297

(22) Filed: Mar. 16, 2021

(65) Prior Publication Data

US 2022/0007903 A1  Jan. 13, 2022

(30) Foreign Application Priority Data

Jul. 13, 2020 (CN) .......................... 202010669285.3

(51) Int. Cl.
| | |
|---|---|
| *A47L 1/02* | (2006.01) |
| *A47L 9/28* | (2006.01) |
| *A47L 11/38* | (2006.01) |
| *F16B 47/00* | (2006.01) |

(52) U.S. Cl.
CPC ............... *A47L 1/02* (2013.01); *A47L 9/2821* (2013.01); *A47L 11/38* (2013.01); *F16B 47/00* (2013.01); *A47L 2201/04* (2013.01)

(58) Field of Classification Search
CPC ... A47L 1/00; A47L 1/02; A47L 11/38; A47L 9/2821; A47L 2201/00; A47L 2201/04
See application file for complete search history.

(56) References Cited

U.S. PATENT DOCUMENTS

| | | |
|---|---|---|
| 9,215,962 B2 | 12/2015 | Qian |
| 9,655,484 B2 | 5/2017 | Qian |
| 9,896,139 B2 | 2/2018 | Chao |
| 10,188,254 B2 | 1/2019 | Qian |
| 10,258,215 B2 | 4/2019 | Qian |
| 10,743,730 B2 | 8/2020 | Chao |
| 2017/0164797 A1* | 6/2017 | Abramson ........... B62D 57/024 |

(Continued)

FOREIGN PATENT DOCUMENTS

| | | |
|---|---|---|
| CN | 106214056 A | 12/2016 |
| CN | 106821132 A | 6/2017 |

(Continued)

OTHER PUBLICATIONS

U.S. Pat. No. 9,215,962B2 corresponds to CN106659349B (undated).
(Continued)

*Primary Examiner* — Randall E Chin
(74) *Attorney, Agent, or Firm* — WPAT LAW; Anthony King

(57) ABSTRACT

Embodiments of the present invention relate to a self-propelled device. The self-propelled device includes: a body defining a first space and a second space in communication with the first space, wherein the volume of the second space is less than the volume of the first space and the second space is closer to an edge of the body than the first space; a moving module adjacent to the body; an air extraction module disposed on the body and in communication with the first space; and an air pressure sensor disposed on a side of the second space. The self-propelled device is configured to move on a panel surface.

19 Claims, 13 Drawing Sheets

(56) References Cited

U.S. PATENT DOCUMENTS

2019/0200832 A1 7/2019 Qian
2020/0214525 A1 7/2020 Lu

FOREIGN PATENT DOCUMENTS

| CN | 104921651 B | 8/2017 | | |
|---|---|---|---|---|
| CN | 107028547 A | 8/2017 | | |
| CN | 206507868 U | 9/2017 | | |
| CN | 104921654 B | 11/2017 | | |
| CN | 107307798 A | 11/2017 | | |
| CN | 109044181 A | 12/2018 | | |
| CN | 209331906 U | 9/2019 | | |
| CN | 106659349 B | 10/2019 | | |
| CN | 110537867 A | 12/2019 | | |
| EP | 2789281 A1 | 10/2014 | | |
| IN | 106264301 A | 1/2017 | | |
| JP | 2018184036 A | 11/2018 | | |
| RU | 2689222 C1 | 5/2019 | | |
| TW | 201641067 A | * 12/2016 | ............... | A47L 1/02 |
| TW | 202023462 A | 7/2020 | | |
| WO | 2015139607 A1 | 9/2015 | | |

OTHER PUBLICATIONS

Notice of Allowance dated May 23, 2022 issued by the Federal Servise for Intellectual Property (Rospatent Agency) .
English Translation of Notice of Allowance dated May 23, 2022 issued by the Federal Servise for Intellectual Property (Rospatent Agency).
English Abstract Translation of CN107028547A.
U.S. Pat. No. 10,743,730B2 corresponds to TW202023462A and RU2689222C1.
Office Action and Cited Reference dated Jun. 7, 2022 issued by the China National Intellectual Property Administration (CNIPA) for the Chinese patent application No. 202010669285.3.
English Summary Translation of Office Action dated Jun. 7, 2022 issued by the China National Intellectual Property Administration (CNIPA) for the Chinese patent application No. 202010669285.3.
Search Report issued by the China National Intellectual Property Administration (CNIPA) for the Chinese patent application No. 202010669285.3.
U.S. Pat. No. 9,896,139B2 corresponds to CN106264301A.
US20200214525A1 corresponds to CN107307798A.
English Abstract Translation of CN106821132A.
U.S. Pat. No. 10,743,730B2 corresponds to CN110537867A.
Extended European Search Report dated Sep. 7, 2021 issued by the European Patent Office for the European patent application No. 21164432.3-1016.
Office Action, Cited Reference and Search Report dated Oct. 26, 2021 issued by the Russian Patent Office for the Russian patent application No. 2021111562/03(024736).
English Translation of the Office Action, Cited Reference and Search Report dated Oct. 26, 2021 issued by the Russian Patent Office for the Russian patent application No. 2021111562/03(024736).
English Abstract of JP2018184036A.
English Abstract of CN106214056A.

* cited by examiner

SELF-PROPELLED DEVICE

PRIORITY CLAIM AND CROSS-REFERENCE

This application claims priority to China Non-provisional Application No. 202010669285.3 filed Jul. 13, 2020, the disclosure of which is hereby incorporated by reference in its entirety.

FIELD OF THE INVENTION

The present invention relates to a self-propelled device.

BACKGROUND OF THE INVENTION

Conventional methods for cleaning windows of households involve opening or removing the windows for cleaning. For windows of a building, a suspension frame is set up outside the building by staffs of a cleaning service company, and the suspension frame is controlled to ascend or descend using a motor, and the windows outside the building are then cleaned by brushes or water jets. However, a suspension frame has an unstable center of gravity and is thus susceptible to swinging when blown by the wind. Windows can only be washed with mild water streams in order to prevent slipping or injures of cleaning staff or resulting from falling off cleaning equipment when they brush and clean the windows with great force; however, the windows may not be thoroughly cleaned in this way.

With respect to conventional cleaning robots, when the cleaning robot exceed an edge of a window while travelling, air may leak out of a suction disk such that the cleaning robots cannot be firmly attached to the surface of the window and may even fall onto the ground. Therefore, there is a need for improvement of the current cleaning robots, in which the cleaning robots are enabled to determine whether they are about to go beyond the window edge and fall off, thereby stop continuing moving in the direction toward the window edge.

SUMMARY OF THE INVENTION

Embodiments of the present invention relate to a self-propelled device including: a body by which a first space and a second space in communication with the first space are defined, wherein the volume of the second space is less than the volume of the first space, and the second space is closer to an edge of the body than the first space; a moving module adjacent to the body; an air extraction module, disposed on the body, being in communication with the first space; and an air pressure sensor disposed on a side of the second space. The self-propelled device is configured to move on a panel surface.

According to an embodiment of the present invention, wherein the body further includes a connecting passage, and the second space is in communication with the first space via the connecting passage.

According to an embodiment of the present invention, wherein the body further includes: a carrier board adjacent to an upper part of the body and including a first carrier board through hole; and a suction disk adjacent to a lower part of the body and connected to the carrier board, the suction disk including a first suction disk through hole corresponding to the first carrier through hole, wherein the first suction disk through hole and the first carrier board through hole define the first space.

According to an embodiment of the present invention, wherein the carrier board includes a carrier board wall encircling the first carrier board through hole, the suction disk further includes a first suction disk wall encircling the first suction disk through hole, and the carrier board wall and the first suction disk wall are configured to fit relative to each other so that the carrier board wall is operable to move relative to the first suction disk wall.

According to an embodiment of the present invention, wherein the carrier board further includes a second carrier board through hole, the suction disk includes a second suction disk wall and a second suction disk through hole, the second suction disk wall encircles the second suction disk through hole, the second suction disk through hole includes a second suction disk opening extending through the suction disk, the second suction disk wall extends through the second carrier board through hole, the air pressure sensor is disposed on a substrate, and the second suction disk wall is sealed by the substrate to form the second space.

According to an embodiment of the present invention, the self-propelled device further includes a cleaning fabric. The cleaning fabric is disposed below the suction disk and is configured to contact the panel surface. The cleaning fabric has a plurality of cleaning fabric openings respectively disposed below the first suction disk through hole and the second suction disk through hole.

According to an embodiment of the present invention, wherein the connecting passage disposed on a lower surface of the suction disk, and the second suction disk through hole is in communication with the connecting passage.

According to an embodiment of the present invention, wherein the first space further includes a recessed region on the lower surface of the suction disk, wherein one end of the connecting passage is connected to the recessed region, and a bottom of the connecting passage is separated from a bottom of the recessed region by a vertical distance.

According to an embodiment of the present invention, wherein the body further includes a third space in communication with the second space. An upper side of the third space faces the lower surface of the suction disk and is in communication with the second space via the second suction disk opening. A lateral side of the third space faces the connecting passage and is communication with the connecting passage. A lower side of the third space faces the cleaning fabric and is exposed through the cleaning fabric opening of the cleaning fabric when a part of the self-propelled device goes beyond a border of the panel surface.

According to an embodiment of the present invention, wherein the body further comprises a third space in communication with the second space, wherein the third space is in communication with the first space via the connecting passage, wherein when an edge of the self-propelled device extends beyond a border of the panel surface, then the second space is in communication with an external environment via the third space, and the first space is in communication with the external environment via the connecting passage and the third space.

According to an embodiment of the present invention, wherein a volume sum of the second space, the connecting passage and the third space is less than the volume of the first space.

Embodiments of the present invention relate to a self-propelled device including: a suction disk, including a first suction disk wall disposed at a center of the suction disk and defining a first suction disk through hole, a plurality of second suction disk walls being adjacent to edges of the suction disk and respectively defining a plurality of second suction disk through holes, and a plurality of connecting passages disposed on the suction disk and being in communication with the first suction disk through hole and the second suction disk through holes; a carrier board, disposed on the suction disk, including a carrier board wall disposed at a center of the carrier board and defining a first carrier board through hole, and a plurality of second carrier board through holes adjacent to edges of the carrier board, the second suction disk walls extending through the second carrier board through holes; a moving module adjacent to the suction disk; a plurality of air pressure sensors disposed on a substrate, the substrate disposed on the carrier board and covering the second suction disk walls; and an air extraction module, disposed on the carrier board wall of the carrier board. The elf-propelled device is configured to move on a panel surface.

According to an embodiment of the present invention, the self-propelled device further includes: a first space, including an internal space defined by the carrier board wall and the first suction disk wall when the carrier board wall and the first suction disk wall fit relative to each other; and second spaces each including an internal space defined by the respective second suction disk walls, the second spaces being in communication with the first space via the respective connecting passages, wherein the air pressure sensors are configured to measure an air pressure of the second spaces. A volume sum of one of the second spaces and one of the connecting passages is less than the volume of the first space.

According to an embodiment of the present invention, wherein one end of one of the connecting passages is connected to a recessed region on a bottom surface of the suction disk, and the other end of the one of the connecting passages is connected to a second suction disk opening of the second suction disk through hole.

According to an embodiment of the present invention, wherein the first suction disk through hole includes a plurality of first suction disk openings.

According to an embodiment of the present invention, wherein the suction disk has a first surface and a second surface corresponding to the first surface, wherein the first suction disk wall and the second suction disk walls protrude from the first surface, and the height of the second suction disk walls is greater than the height of the first suction disk wall.

According to an embodiment of the present invention, the self-propelled device further includes a cleaning fabric. The cleaning fabric is attached to the second surface of the suction disk and is configured to contact the panel surface. The second surface of the suction disk includes a plurality of shallow grooves where hook and loop fasteners are arranged for attachment of the cleaning fabric.

According to an embodiment of the present invention, wherein the suction disk further includes a plurality of trenches. The trenches are adjacent to an edge of the suction disk, and the second suction disk opening is disposed on a bottom of the trenches.

According to an embodiment of the present invention, wherein each of the trenches includes a plurality of branches, and the branches extend in at least two non-parallel directions on the second surface of the suction disk.

According to an embodiment of the present invention, wherein the cleaning fabric includes a plurality of cleaning fabric openings, and the cleaning fabric openings overlap the trenches in a vertical direction.

According to an embodiment of the present invention, wherein the connecting passage is adjacent to the first surface of the suction disk, and one end of one of the connecting passages is in communication with a sidewall of the first suction disk wall and the other end of the one of the connecting passages is in communication with a sidewall of one of the second suction disk walls.

BRIEF DESCRIPTION OF THE DRAWINGS

The embodiments below provide better understanding for aspects of the present disclosure when read in combination with the accompanying drawings. It should be noted that the structures depicted are not drawn to scale according to standard implementations in industry. In fact, for better illustration, the dimensions of the structures can be increased or reduced as desired.

DETAILED DESCRIPTION OF THE EMBODIMENTS

Figure 1:
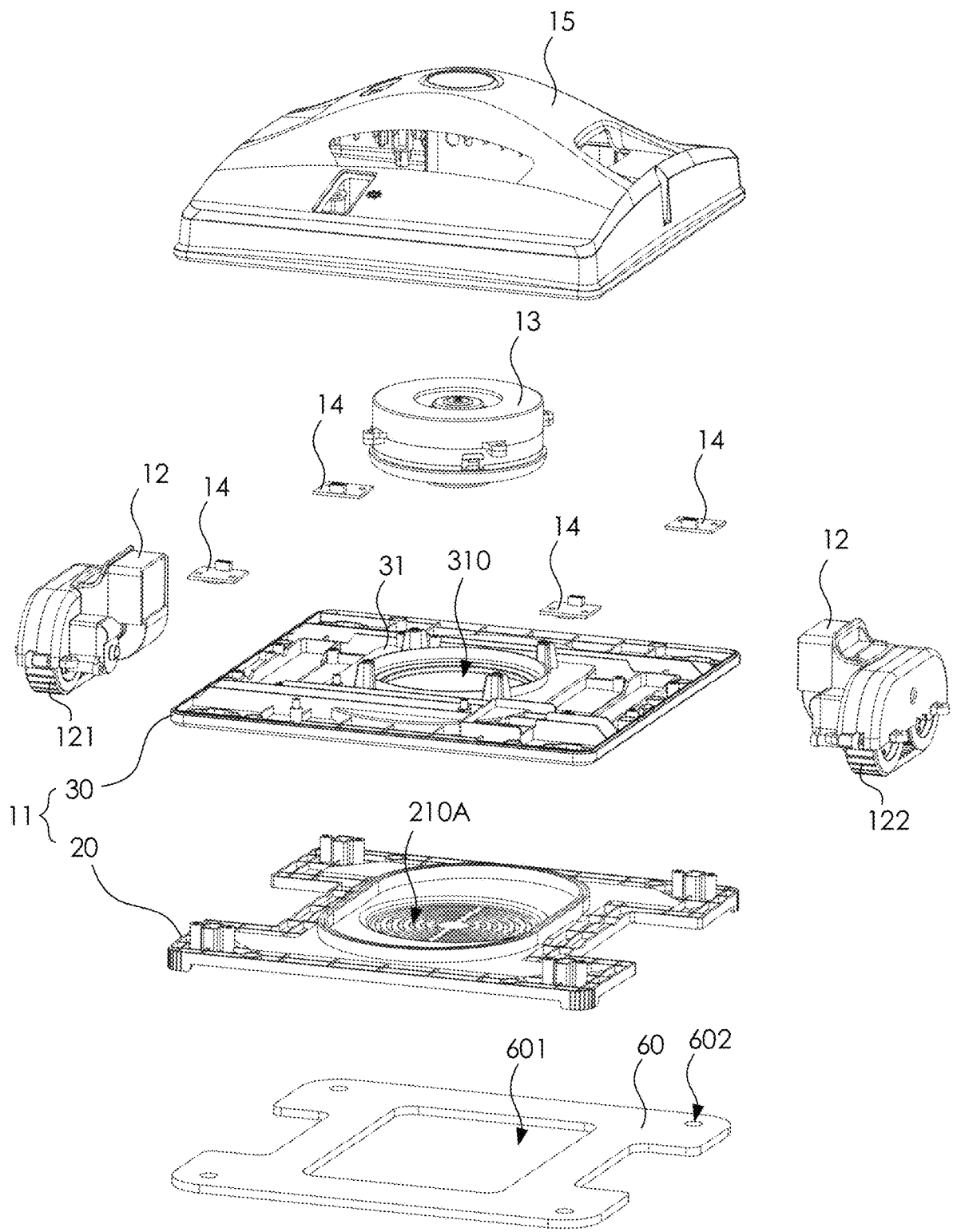
FIG. 1 is an exploded structural diagram of a self-propelled device according to an embodiment of the present invention.

The disclosure below provides numerous embodiments or examples of different components for implementing the provided subject matter. In the description below, specific examples of components and arrangements are given to simplify the present disclosure. It should be noted that these are only examples and are not to be construed as limitations. For example, in the description below, a first component formed above or on a second component may include an embodiment in which the first component and the second component are formed as being in direct contact, and can further include an embodiment in which an additional component is formed between the first component and the second component such that the first component and the second component are not in direct contact. Moreover, numerals and/or letters can be repeatedly referred to in various examples. Such repetition is for the purpose of simplicity and clarity, and does not depict the relationship between the various embodiments and/or configurations.

Furthermore, for better illustration, for example, relative spatial terms such as "below", "under", "beneath", "above", "on", "over" and the like can be used to describe the relationship of one component or member relative to another component or member in the drawings. Apart from the directions given in the drawings, the relative spatial terms are expected to encompass different directions of a device in use or in operation. An apparatus can be oriented by other means (rotated by 90 degrees or oriented otherwise), and therefore the spatially relative descriptors used herein can also be interpreted accordingly.

For example, technical terms such as "first", "second" and "third" are used in the disclosure to describe various components, elements, regions, layers and/or segments; however, such components, elements, regions, layers and/or segments should not be limited by such technical terms. Such technical terms are used to merely differentiate one component, element, region, layer or segment. For example, the technical terms "first", "second" and "third" do not imply any sequence or order when used in the disclosure, unless otherwise explicitly specified in the background contents.

The present invention relates to a self-propelled device which can be sucked to an inclined or vertical planar surface, and freely move on the inclined or vertical planar surface without falling off as a result of the gravitational attraction. In some embodiments, the self-propelled device can be a toy, a remote-controlled car, a cleaning apparatus or a window cleaning machine, wherein the cleaning apparatus or window cleaning machine serve the cleaning function, and can clean the surface to which it is sucked while moving and achieve the object of surface cleaning by moving back-and-forth on the planar surface. A cleaning apparatus or a window cleaning machine is described as an example below for illustrational purposes: however, the present invention is not limited thereto.

FIG. 1 shows an exploded structural diagram of a self-propelled device according to an embodiment of the present invention. As shown in FIG. 1, in some embodiments, the self-propelled device includes a body 11, a moving module 12, an air extraction module 13 and a plurality of air pressure sensors 14. The moving module 12 is disposed on two opposite sides of the body 11, and both of the air extraction module 13 and the air pressure sensors 14 are disposed on the body 11.

In some embodiments, the self-propelled device is adapted to be attached to a panel 40 (shown in FIG. 7A) and to move on the panel surface by the moving module 12 to clean dust or stains on the panel surface. In some embodiments, the board can be a vertically arranged window. As shown in FIG. 1, the moving module 12 can include moving components 121 and 122, which can be assemblies capable of providing movement, such as pulleys and rollers, so as to drive the self-propelled device forward and backward or make a turn on the panel surface. In the embodiment shown, the moving components 121 and 122 are pulleys, and include a continuous track and two driving wheels driving the continuous track.

In order to enable the self-propelled device to move on a non-horizontally placed board and can be sucked to the panel surface without falling off, the body 11 is arranged in combination with the air extraction module 13. More specifically, in some embodiments, the body 11 includes a suction disk 20 and a carrier board 30, and the body 11 can be configured such that the suction disk 20 and the carrier board 30 are arranged in a stack so that the carrier board 30 is adjacent to the upper part of the body 11 and the suction disk 20 is adjacent to the lower part of the body 11. In some embodiments, the moving module 12 can be connected to the body 11. More specifically, the moving module 12 can be disposed in the body 11 or directly lean on the body 11. In some embodiments, the moving module 12 can be adjacent to two sides of the suction disk 20. The air extraction module 13 is disposed on the carrier board 30 and extracts air in a direction from the carrier board 30 to the air extraction module 13, such that air near the panel surface is extracted from the panel surface through the suction disk 20 and the carrier board 30 and extracted out of the air extraction module 13, thereby generating a negative pressure between the self-propelled device and the panel surface. Thus, a force is produced by atmospheric pressure upon the self-propelled device to suck the self-propelled device to the panel surface. In an embodiment, the air extraction module 13 includes a pump.

More specifically, the present invention implements a negative-pressure space among the panel surface, the body 11 and the air extraction module 13, allowing the self-propelled device to move on a non-horizontally placed board without falling off. In some embodiments, the space having a negative pressure formed therein can be further divided into a first space and a second spaced defined by the body 11, wherein the first space is in communication with the second space. More specifically, the first space and the second space is separated by the structures of the suction disk 20 and the carrier board 30.

In an embodiment, the plurality of air pressure sensors 14 are for measuring air pressure in the self-propelled device. In an embodiment, air pressures in the first space and the second space are measured respectively to detect the status of the negative-pressure produced by air extraction of the air extraction module 13. Thus, when the negative-pressure changes, it can be determined accordingly as to whether air tightness in the first space and the second space has changed.

In some embodiments, the self-propelled device includes a housing 15 having an accommodation space therein for accommodating the body 11, the moving module 12, the air extraction module 13 and the plurality of air pressure sensors 14. In some embodiments, the self-propelled device includes a housing 15, or a spray module (not shown) which can be embedded in the housing 15 or attached or adhered to the housing 15 to spray cleaning liquid such as dean water or a detergent.

In some embodiments, the self-propelled device includes a cleaning fabric 60 which is attached to a second surface 20B (shown in FIG. 2B) of the suction disk 20 and is configured to come into contact with a panel surface 40A. In some embodiments, an outer surface of the cleaning fabric 60 has fibers for cleaning, and includes an elastic plastic plate therein as an internal lining structure thereof. Thus, the cleaning fabric 60 provides a shielding effect to prevent air from passing therethrough, except for a first cleaning fabric opening 601 and a plurality of second cleaning fabric openings 602 formed thereon.

Figure 2A:
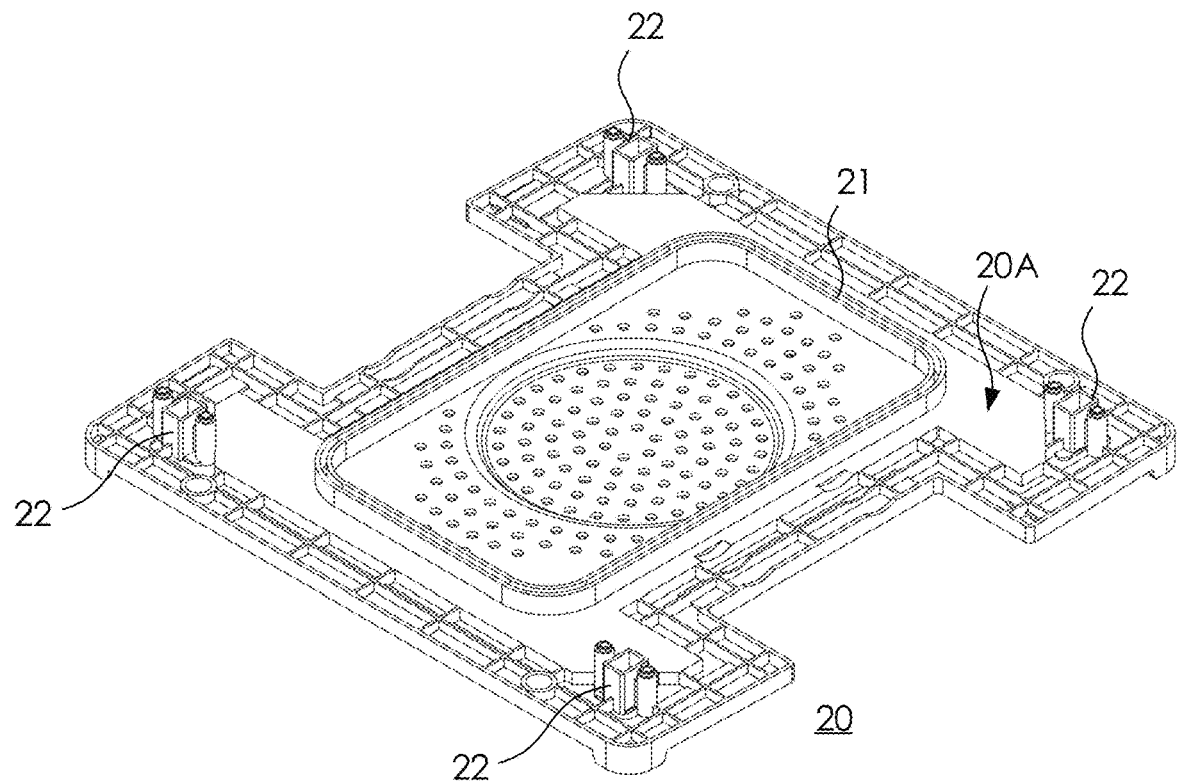
FIG. 2A is a three-dimensional diagram of a suction disk according to some embodiments of the present invention to show an upper side that is, a first surface, adjacent to the suction disk.
Figure 2B:
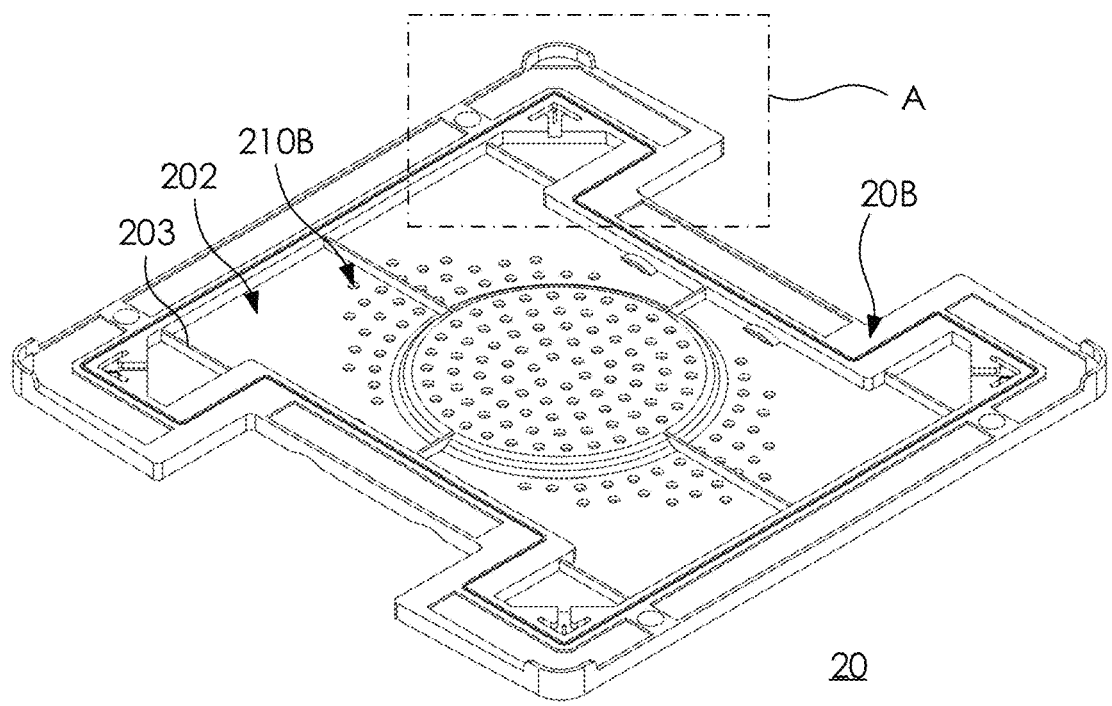
FIG. 2B is a three-dimensional diagram of a suction disk according to some embodiments of the present invention to show a lower side that is, a second surface, adjacent to the suction disk.

Please refer to the exploded three-dimensional diagram of FIG. 1 as well as three-dimensional diagrams of a suction disk in FIG. 2A and FIG. 2B. FIG. 2A and FIG. 2B shows the views from near the upper side and the lower side, respectively, of the suction disk 20. In some embodiments, the suction disk 20 has a first surface (an upper surface) 20A and a second surface (a lower surface) 20B corresponding to the first surface 20A. The suction disk 20 includes a sealing structure for forming part of sidewalls of the first space and the second space on the first surface 20A. In some embodiments, the suction disk 20 includes a first suction disk wall 21 and a plurality of second suction disk walls 22 protruding from the first surface 20A. The first suction disk wall 21 is located at the center of the suction disk 20, and an interior thereof serves as part of the first space. The second suction disk walls 22 are respectively adjacent to the edges of the suction disk 20, and interiors of the second suction disk walls 22 serve as part of the second space. In some embodiments, the suction disk 20 has a shape similar to an H-shape, and thus four second suction disk walls 22 are respectively located on the structures of four branches extending from the suction disk 20. In some embodiments, the volume of the second space is less than the volume of the first space. Furthermore, in an embodiment, the first suction disk wall 21 and the plurality of second suction disk walls 22 can also be non-protruding from the first surface 20A. For example, as shown in FIG. 7B and FIG. 7C, the second suction disk walls 22 can also be arranged as non-protruding from the first surface 20A.

Again referring to FIG. 1, in some embodiments, the carrier board 30 disposed on the suction disk 20 has a carrier board wall 31 which is located at the center of the carrier board 30 and is used to fit to the first suction disk wall 21 so as to form a sealed structure. Moreover, the carrier board wall 31 is operable to move relative to the first suction disk wall 21. For example, the carrier board wall 31 can protrude toward the surface facing away from the suction disk 20 and a corresponding slot (not shown) is formed on a surface of the carrier board 30 facing the suction disk 20, allowing the first suction disk wall 21 to be inserted in the slot. In some embodiments, the body 11 can include at least one pivotal shaft (not shown) for limiting movement, in a vertical direction, of the fitted carrier board 30 and suction disk 20, such that the self-propelled device is allowed to change in thickness in the vertical direction while keeping the carrier board 30 and the suction disk 20 from being separated from each other. For example, the pivotal shafts can be near a corner of the suction disk 20, fixed on the suction disk 20 and extend in the direction toward the carrier board 30. The carrier board 30 can then be movably connected to the suction disk 20 by means of the pivotal shafts. When the thickness of the self-propelled device is increased or decreased, the volume of the first space is also increased or decreased correspondingly.

More specifically, in some embodiments, the carrier board 30 is provided with a plurality of through vias, and the pivotal shafts pass through these through vias. The lengths of the pivotal shafts are greater than the lengths of the corresponding through vias, allowing the suction disk 20 to be pivotally connected to the carrier board 30 by the pivotal shafts, and allowing the suction disk 20 to move along the long axis of the pivotal shafts. As such, the suction disk 20 can provide movement relative to the pivotal shafts and the carrier board 30, and can be moved by the carrier board 30. In a preferred situation, the long axis of the pivotal shaft is substantially parallel to the normal direction perpendicular to the bottom surface of the suction disk 20, allowing the suction disk 20 to move in the normal direction.

Figure 3A:
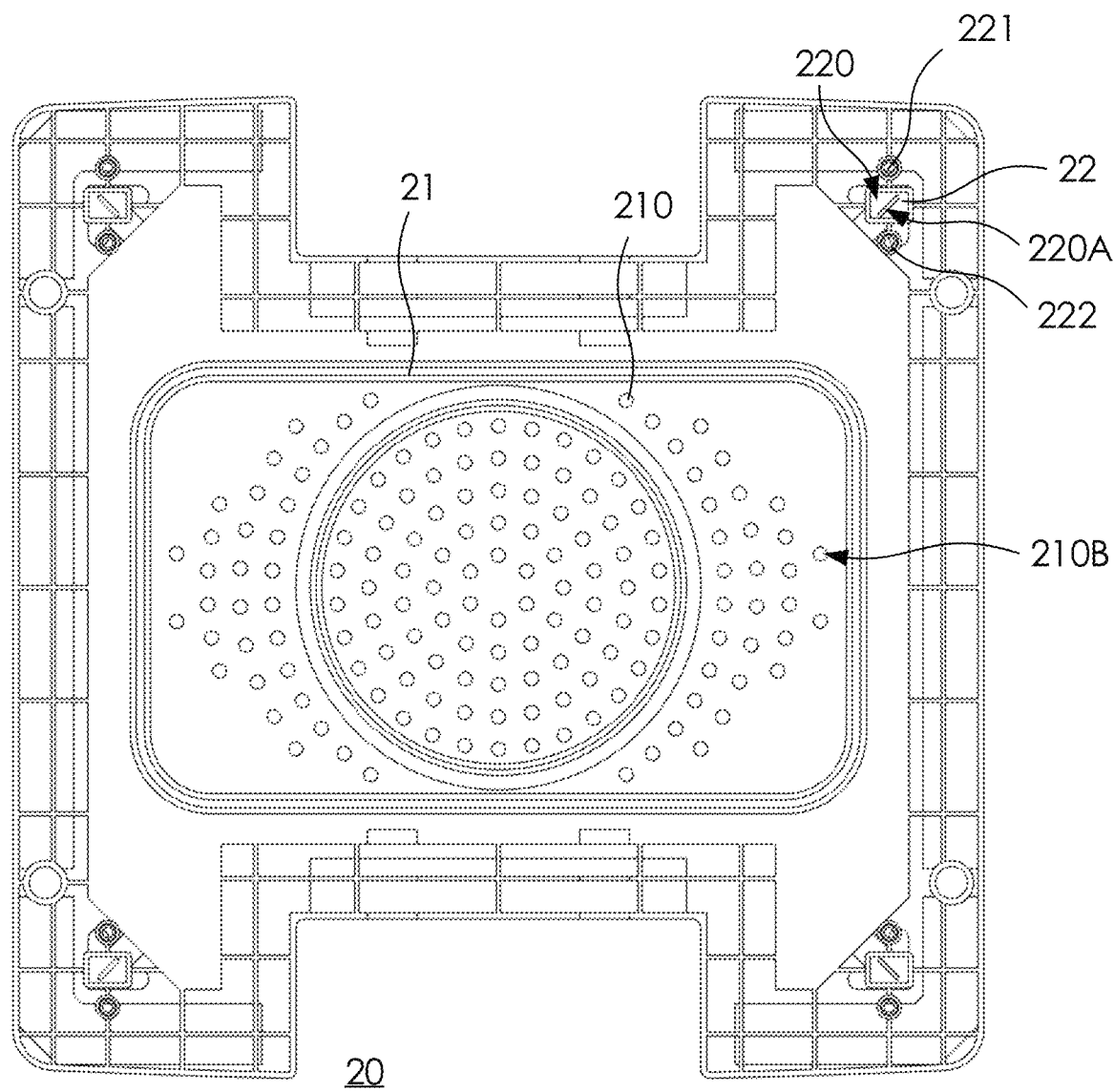
FIG. 3A is a top view of a suction disk according to some embodiments of the present invention.

FIG. 3A shows a top view of the suction disk 20 viewed from the first surface 20A of the suction disk 20. As shown in FIG. 3A, in some embodiments, the suction disk 20 has a first suction disk through hole 210 and a plurality of second suction disk through holes 220. In some embodiments, the first suction disk through hole 210 is defined by the first suction disk wall 21; for example, the first suction disk wall 21 encircles the first suction disk through hole 210. The second suction disk through holes 220 are defined by the second suction disk walls 22; for example, the second suction disk walls 22 encircle the respective second suction disk through holes 220. In some embodiments, the first suction disk wall 21 defines the first suction disk through hole 210 before sealing, and defines the first space or at least part of the first space after sealing. In some embodiments, the second suction disk wall 22 defines the second suction disk through hole 220 before sealing, and defines the second space or at least part of the second space after sealing.

In some embodiments, the first suction disk through hole 210 can include a plurality of first suction disk openings which extend through the suction disk 20 and are distributed in an area encircled and defined by the first suction disk wall 21. The first suction disk opening can be an arc-shaped opening (such as the first suction disk opening 210A shown in FIG. 1) or a circular hole (such as the first suction disk opening 210B shown in FIG. 3A). The second suction disk through hole 220 can include a second suction disk opening 220A extending through the suction disk 20. In some embodiments, the second suction disk opening 220A can include a slit-like opening or a strip-like opening extending through the suction disk 20. The size of the second suction disk opening 220A is smaller than the area encircled and defined by the second suction disk wall 22. In some embodiments, the size of the second suction disk opening 220A is between 4% and 50% of the area encircled and defined by the second suction disk wall 22, and preferably, between 10% and 30%. In the present embodiment, the second suction disk opening 220A has an area equal to or less than 50% of the area encircled and defined by the second suction disk wall 22, which advantageously prevents dust or water drops from entering the second suction disk through hole 220 via the second suction disk opening 220A, or equivalently, the second space enclosed by the second suction disk wall 22. As a result, the air pressure sensor 14 in the second space may have longer lifetime (the configurations of the air pressure sensors 14 are detailed later). On the other hand, the second suction disk opening 220A having an area equal to or greater than 4% of the area encircled and defined by the second suction disk wall 22 can ensure sufficient amount of air flowing into the second space, so that a noticeable change in the negative pressure of the second space can be detected when the self-propelled device exceeds the border of the panel surface (the relationship between the second suction disk opening 220A and the movement position of the self-propelled device are detailed later).

Figure 3B:
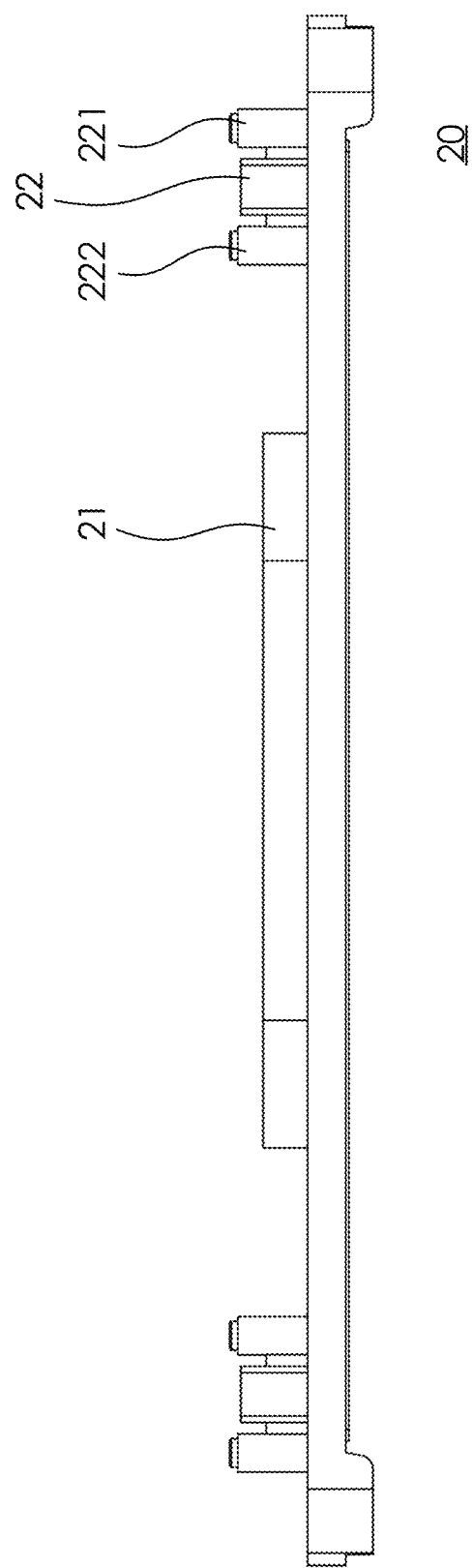
FIG. 3B is a side view of a suction disk according to some embodiments of the present invention.

FIG. 3B shows a side view of the suction disk 20. As shown in FIG. 3B, in some embodiments, the height of the second suction disk wall 22 is greater than the height of the first suction disk wall 21.

Figure 4:
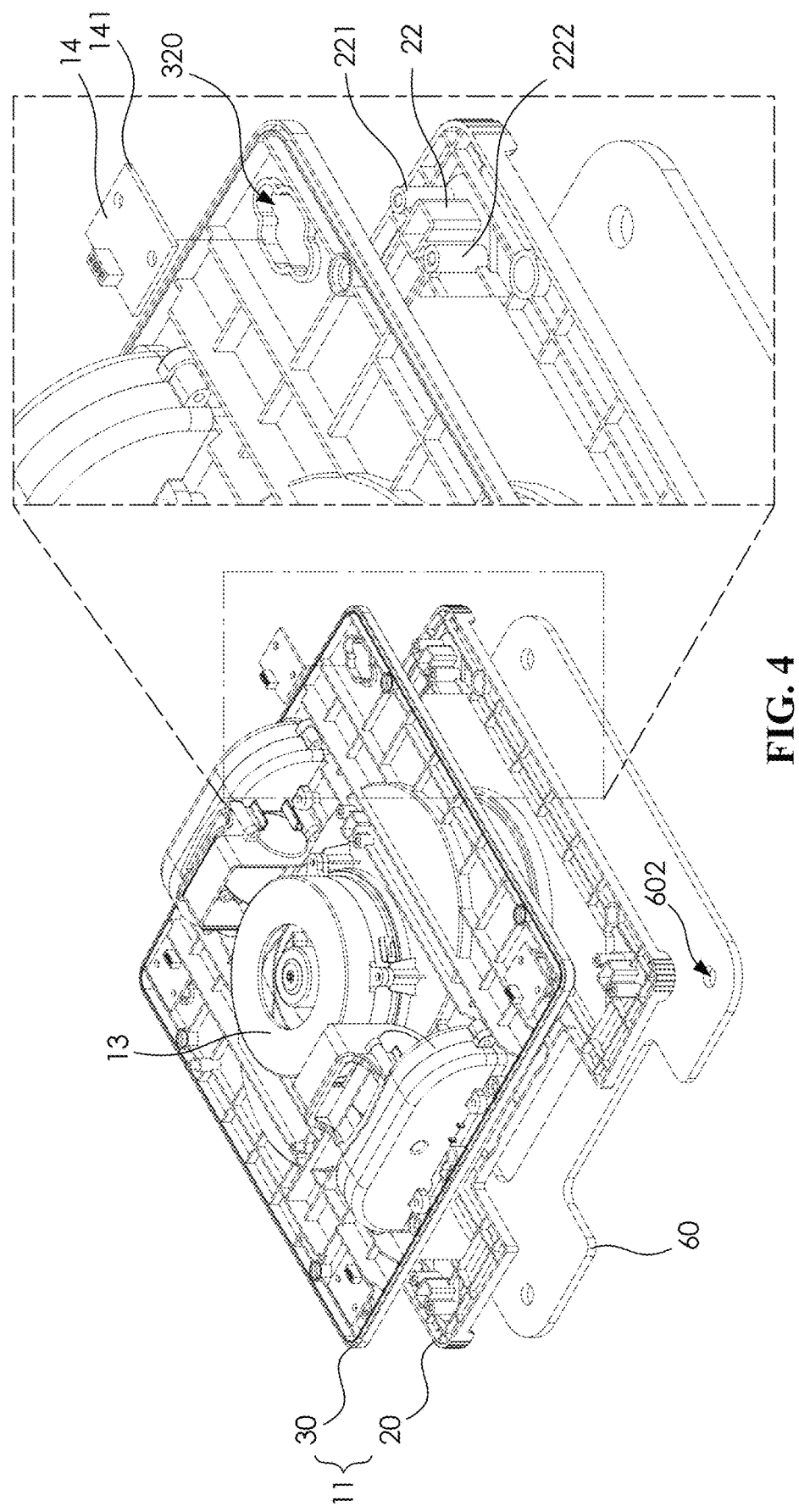
FIG. 4 is a partial enlarged three-dimensional diagram of a suction disk and a carrier board adjacent to each other, according to some embodiments of the present invention.

Referring to FIG. 1 and FIG. 4, FIG. 4 shows a partial enlarged three-dimensional diagram of the body 11 in which the suction disk 20 and the carrier board 30 are adjacent to each other. In some embodiments, the carrier board 30 has a first carrier board through hole 310 and a plurality of second carrier board through holes 320. In some embodiments, the first carrier board through hole 310 is defined by the carrier board wall 31; for example, the carrier board wall 31 encircles the first carrier board through hole 310. The second carrier board through hole 320 is disposed on the carrier board 30. In some embodiments, the second carrier board through holes 320 are respectively adjacent to the edges of the carrier board 30, and are aligned in the vertical direction with the respective second suction disk walls 22 of the suction disk 20 below the carrier board 30. In some embodiments, an inner sidewall of the second carrier board through holes 320 has a shape similar to an outer sidewall of the second suction disk walls 22. For example, the size of the inner sidewall of the second carrier board through holes 320 is slightly greater than the size of the outer sidewall of the second suction disk walls 22, such that the second suction disk walls 22 extend through the second carrier board through holes 320, and the suction disk 20 and the carrier board 30 can move in the vertical direction along the structure of the second suction disk walls 22 through causing the second suction disk walls 22 to pass through the second carrier board through holes 320.

As described previously, during operation according to the present invention, the air extraction module 13 extracts air from near the panel surface through the suction disk 20 and the carrier board 30, and then the air is extracted out of the air extraction module 13. In coordination with the disclosed structure, part of air flowing in a flow path of the self-propelled device enters into the space enclosed by the first suction disk wall 21 through the first suction disk through hole 210 of the suction disk 20 (for example, through the first suction disk opening 210A or 210B passing through the suction disk 20), through the space defined by the carrier board wall 31 via the first carrier board through hole 310 of the carrier board 30, and extracted by the air extraction module 13 on the carrier board 30. In other words, the first space defined by the body 11 according to an embodiment of the present invention substantially includes the space enclosed and defined by the board, the first suction disk wall 21 and the carrier board wall 31, and the space has one end covered by the air extraction module 13.

Referring to the exploded three-dimensional diagram of FIG. 1 and the three-dimensional diagram of the suction disk shown in FIG. 2B depicting the second surface 20B of the suction disk 20. In some embodiments, the second surface 20B of the suction disk 20 includes a recessed region 202 which is closer to the center of the second surface 20B of the suction disk 20 than the second suction disk through hole 220 and is in communication with the first suction disk opening 210B extending through the suction disk 20. The recessed space of the recessed region 202 is also part of the first space and is adjacent to the panel surface to which the self-propelled device is attached during operation of the self-propelled device. In some embodiments, the panel surface can serve as one end that seals the first space, and air in the recessed space of the recessed region 202 of the suction disk 20, the space enclosed by the first suction disk wall 21 and the space enclosed by the carrier board wall 31 is extracted by the air extraction module 13 covering the other end of the first space, such that the first space is provided with a negative pressure, allowing the self-propelled device to move on a non-horizontal board without falling off. In some embodiments, the recessed region 202 is provided with a plurality of ribs 203 for reinforcing the structural rigidity of the suction disk 20. In some embodiments, the height of the ribs 203 is smaller than the depth of the recessed region 202 so as to allow air to flow freely in the recessed region 202.

Refer to the three-dimensional diagram of a suction disk of FIG. 2A and the partial enlarged three-dimensional diagram of FIG. 4. In some embodiments, the second space is substantially defined by the space enclosed by the second suction disk wall 22, and the second space has one side covered by the air pressure sensor 14 or a substrate 141 on which the air pressure sensor 14 is disposed. More specifically, the interior of the second suction disk wall 22 at least serves as part of the second space. Since one side of the second suction disk wall 22 is covered by the substrate 141 on which the air pressure sensor 14 is disposed, the substrate 141 seals this end of the second space accordingly. In some embodiments, the substrate 141 is a printed circuit board, and the air pressure sensor 14 is electrically connected to a circuit of the substrate 141. The substrate 141 can provide power to the air pressure sensor 14 and output information on the air pressure obtained thereby. The other end of the second space is provided with the second suction disk opening 220A (shown in FIG. 3A) of the suction disk 20. The second suction disk opening 220A allows a second space 52 to be in direct or indirect communication with a first space 51 (illustrated in variant embodiments shown in FIG. 7A to FIG. 7E). For example, the second suction disk opening 220A allows the second space 52 to be in communication with the first space 51 via a connecting passage 24 (shown in FIG. 6), or initially in communication with a third space 53 (shown in FIG. 7A) and subsequently in communication with the first space 51 via the connecting passage 24, As previously described, the first space 51 is provided with a negative pressure due to air extracted by the air extraction module 13. Thus, when the air extraction module 13 extracts air, the second space 52 in communication with the first space 51 is also provided with a negative pressure since the air in the second suction disk wall 22 enters into the first space 51 via the second suction disk opening 220A and is extracted.

The air pressure sensor 14 is configured to measure the air pressure of the second space. In some embodiments, the air pressure sensor 14 can be disposed on one side of the substrate 141 facing the interior of the second suction disk wall 22. In some embodiments, the air pressure sensor 14 can be disposed on a surface inside the second suction disk wall 22 instead of being disposed on the substrate 141, such that the substrate 141 only serves the function of sealing one end of the second suction disk wall 22 without the air pressure sensor 14 formed thereon. In some embodiments, positioning pillars 221 and 222 are provided on two sides of the second suction disk wall 22, and the substrate 141 can be fixed at the positioning pillars 221 and 222 to seal one end of the second suction disk wall 22. In other words, in some embodiments of the present invention, the substrate 141 is not connected to the carrier board 30 but seals one end of the second suction disk wall 22. The substrate 141 is located above the carrier board 30 and moves along with the movement of the suction disk 20 since the second suction disk wall 22 extends through the second carrier board through hole 320 of the carrier board 30. In some embodiments, the outer sidewall of the substrate 141 does not correspond to the inner sidewall of the second carrier board through hole 320; for example, the shape of the outer sidewall of the substrate 141 is greater than the shape of the inner sidewall of the second carrier board through hole 320. Thus, the substrate 141 fixed at the positioning pillars 221 and 222 can prevent the second suction disk wall 22 from separating from the second carrier board through hole 320. As a result, the suction disk 20 and the carrier board 30 will not be separated easily.

In an embodiment of the present invention, the second suction disk wall 22 is adjacent to the edge of the suction disk 20, and thus the second suction disk through hole 220 defined thereby is also adjacent to the edge of the suction disk 20. Accordingly, when the self-propelled device moves on the panel surface, if the self-propelled device is very close to a border of the panel surface and even goes beyond the panel surface, a gap will appear at the end of the second space adjacent to the panel surface earlier. That is to say, the air-tight status of the second space is impacted earlier than the air-tight status of the first space. In some embodiments, the change of the negative pressure in the second space can be used to determine whether the self-propelled device has moved to the border of the panel surface or even gone beyond the panel surface, thereby enabling the self-propelled device in real time to stop moving in the direction leading beyond the border of the panel surface, or even to reverse and move in an opposite direction, thereby restoring the status of the negative pressure in the second space.

Figure 5:
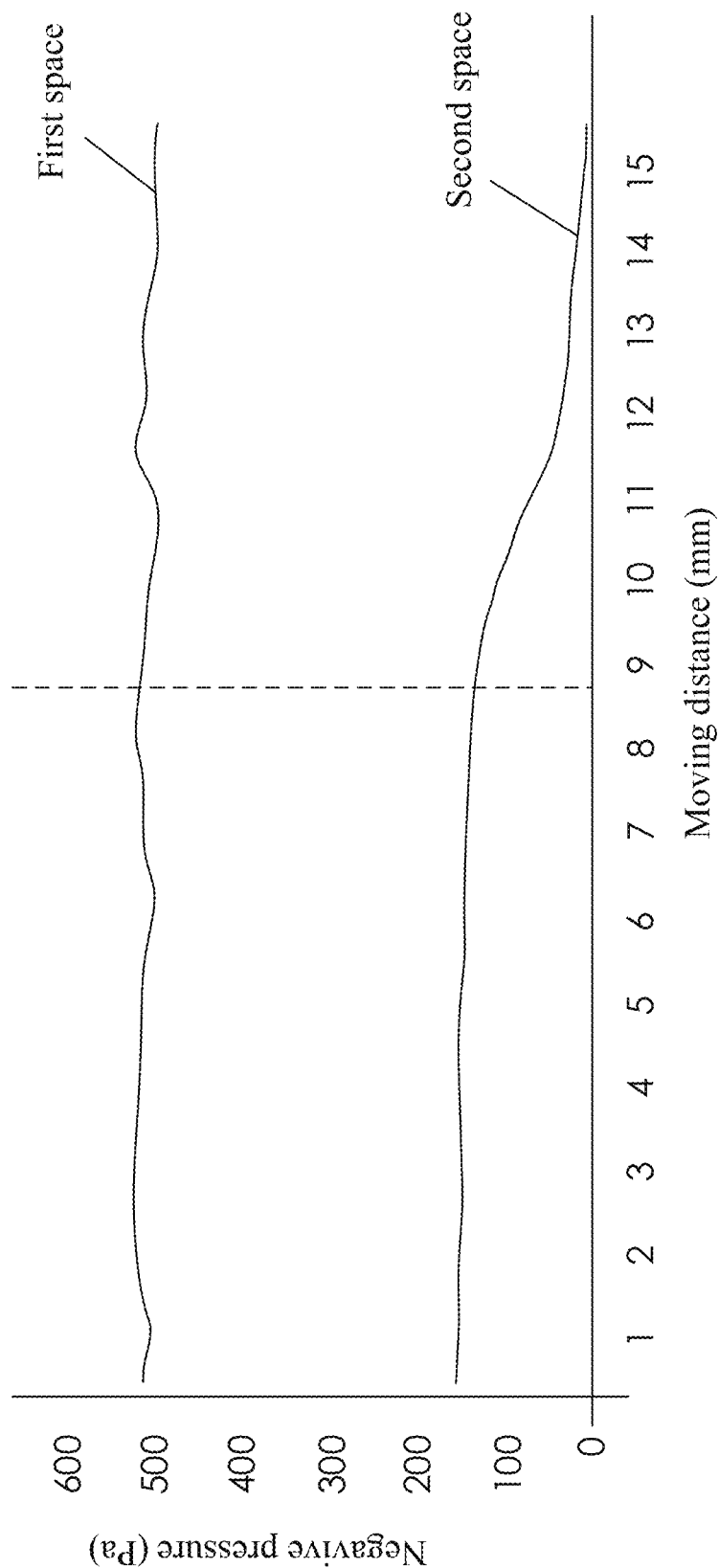
FIG. 5 is a diagram showing changing curves of negative pressures of a first space and a second space according to some embodiments of the present invention.

The present invention uses the negative pressure in the second space to determine whether the self-propelled device is about to fall off from the panel surface. For example, FIG. 5 shows a comparison between a negative pressure value in the first space and a negative pressure value in the second space along with a moving distance of the self-propelled device, wherein the horizontal axis represents a distance (in a unit of mm) by which the self-propelled device moves toward the edge of the board, and the vertical axis represents negative pressure representative values (in a unit of Pa) in the first space and the second space. The negative pressure values in FIG. 5 are drawn in measurement values and are thus represented in positive values. It should be noted that, the readings in FIG. 5 are reading values of a measurement system, and actual pressure values need to be converted form the reading values and are approximately 4.1 times of the corresponding reading values. In some embodiments, the average negative pressure in the first space is greater than the average negative pressure in the second space. This is because the negative pressure of the first space is the main source of the suction force attracting the self-propelled device onto the panel surface and the first space is closer to the air extraction module 13 located on the carrier board wall 31, while the negative pressure in the second space is used for determining whether the edge of the self-propelled device has gone beyond the panel surface and so the second space is farther away from the air extraction module 13 but closer to the edge of the self-propelled device. For example, as shown in FIG. 5, when the self-propelled device has linearly moved for more than 9 mm, no significant change is found in the negative pressure of the first space, while the negative pressure in the second space already starts to decrease. It can be thus deduced that the edge of the self-propelled device has gone beyond the panel surface at this time, such that the second suction disk opening 220A is no longer directly or indirectly covered by the panel surface. Therefore, air can be supplied into the second suction disk wall 22 through the second suction disk opening 220A, leading to a change in the negative pressure value detected by the air pressure sensor 14. This may prompt reactive measures in real time before the negative pressure value in the first space also starts to change. For example, the self-propelled device can be configured to move backward at this time till the negative pressure value of the second space is restored, or information on the location of the self-propelled device can be further integrated and analyzed to help depict the profile of the board.

Figure 6:
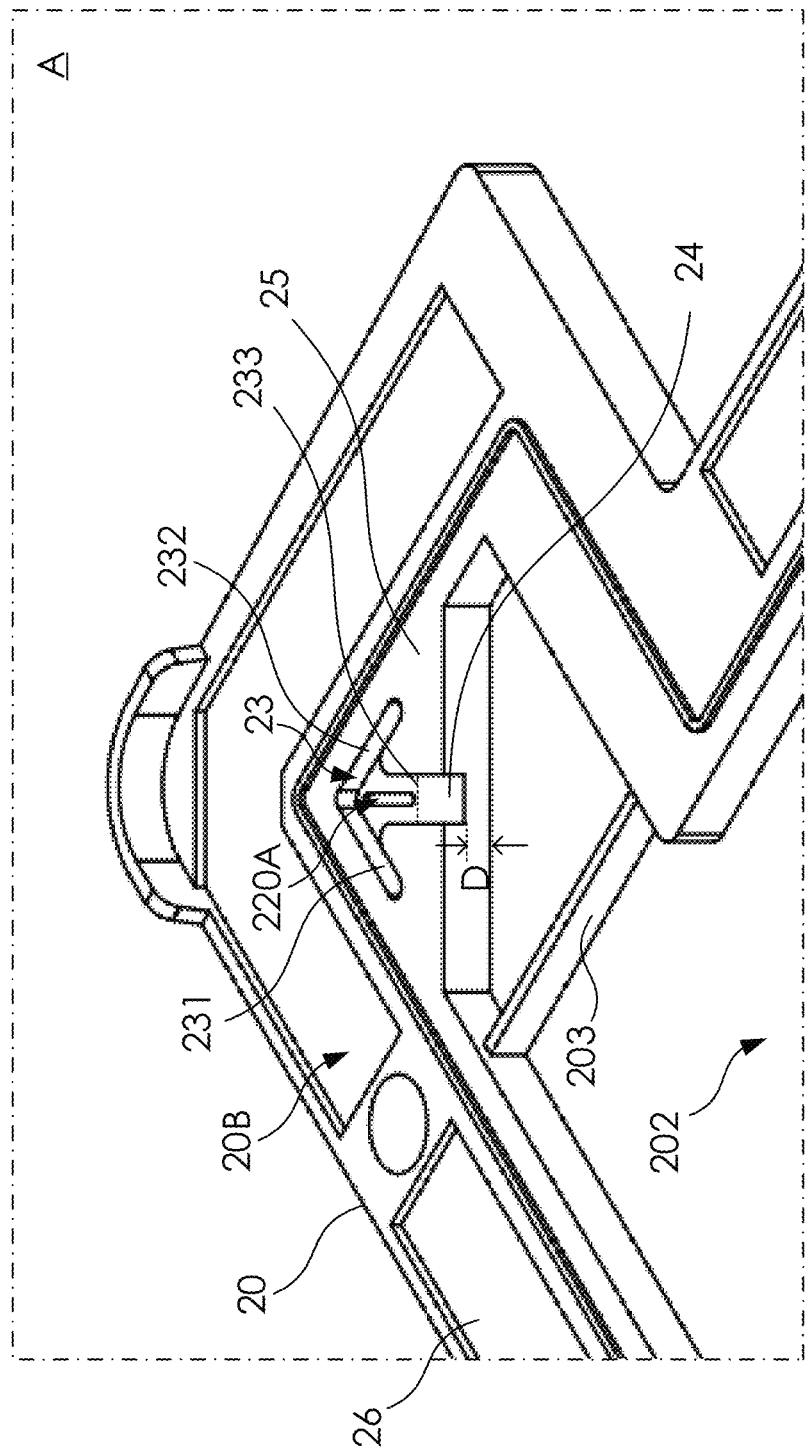
FIG. 6 is a partial enlarged three-dimensional diagram of a suction disk according to some embodiments of the present invention.

As shown in a partial enlarged three-dimensional diagram of the suction disk 20 in FIG. 6, which takes a region A in the enlarged diagram in FIG. 2B as example, wherein the second suction disk opening 220A is located at an edge of the second surface 20B of the suction disk 20. In some embodiments, the second suction disk opening 220A on the second surface 20B is located on a bottom of a trench 23. In some embodiments, the recess 23 has an arrow like shape, with two arrow branches 231 and 232 extending in two different directions on the second surface 20B of the suction disk 20, for example, in directions perpendicular to each other, and a shaft 233 of the arrow is substantially level with the slit-like opening or the strip-like opening of the second suction disk opening 220A and is connected to one end of the connecting passage 24 (a border between the two is illustrated by the dotted line). In some embodiments, the other end of the connecting passage 24 is connected to an edge of the recessed region 202, and a height difference exists between the connecting passage 24 and the recessed region 202. As shown in the diagram, there is a vertical distance D between a bottom of the connecting passage 24 and a bottom of the recessed region 202.

In some embodiments, the connecting passage 24 has a width of about 1 mm to about 10 mm and a depth of about 1 mm to about 4 mm. In some embodiments, the connecting passage 24 is used for connecting the first space and the second space; for example, one end of the connecting passage 24 is connected to the recessed region 202 that is part of the first space and has a height difference of the vertical distance D from the recessed region 202. The other end of the connecting passage 24 is connected to the trench 23 provided with the second suction disk opening 220A. Further, if the cross section area of the connecting passage 24 is made too small, air cannot freely pass through the connecting passage 24. The air extraction module 13 cannot easily extract the air in the second space through the connecting passage 24. If the cross section area of the connecting passage 24 is made too large, the status of changes in the negative pressures of the first space and the second space are too close. For example, when the negative pressure in the second space starts to decrease, the negative pressure of the first space also starts to decrease, such that the self-propelled device soon becomes unable to be sucked to the panel surface and hence fails to provide early warning with respect to the position of the self-propelled device as mentioned above.

Referring to FIG. 1 and FIG. 6, the trench 23 serves to connect the second cleaning fabric opening 602 on the edge of the cleaning fabric 60 to the second suction disk opening 220A of the suction disk 20, and facilitates alignment of the second suction disk opening 220A with the second cleaning fabric opening 602 on the edge of the cleaning fabric 60. Thus, if the cleaning fabric 60 is not aligned with the second surface 20B of the suction disk 20 after being adhered thereto, or if the cleaning fabric 60 is somewhat deformed due to repeated washing, the second cleaning fabric opening 602 on the edge of the cleaning fabric 60 can overlap the trench 23 in the vertical direction. This may allow air to enter the trench 23 via the second cleaning fabric opening 602, flow through the trench 23 and then enter the second space via the second suction disk opening 220k As a result, the cleaning fabric 60 will not completely block the trench 23, and therefore the performance of detecting the pressure drop in real time through the second space and the air pressure sensor 14 will not be impacted. Therefore, preferably, the arrow branches 231 and 232 respectively extend toward different directions to expand the greater area of reach of the trench 23 to be better aligned with the second cleaning fabric opening 602.

Furthermore, in some embodiments, the cleaning fabric 60 can be adhered to the backside of the suction disk 20; for example, the cleaning fabric 60 can be in direct contact with mesas 25 on two sides of the connecting passage 24 without contacting the recessed region 202. In some other embodiments, the edges of the suction disk 20 care include a plurality of shallow grooves where hook and loop fasteners are arranged to adhere to the cleaning fabric 60.

In some embodiments, the trench 23 alone is used to define a third space, which by definition is not part of the second space. In other words, in such embodiment, the second space is limited to a space enclosed by the second suction disk wall 22, in which the second space has one end covered by the substrate 141 and the other end ended at the second suction disk opening 220A, and the second space is in communication with the third space defined by the structure of the trench 23 via the second suction disk opening 220A. More specifically, in this connection, the third space is in communication with the second space via the second suction disk opening 220A, and the third space is in communication with the first space via the connecting passage 24. Thus, with respect to the second space with the negative pressure provided by the air extraction module 13, air in the second space substantially leaves the second space via the second suction disk opening 220A and enters the third space, through the third space via the connecting passage 24, through the connecting passage 24, and enters the first space, and is eventually extracted by the air extraction module 13 from the first space.

Figure 7A:
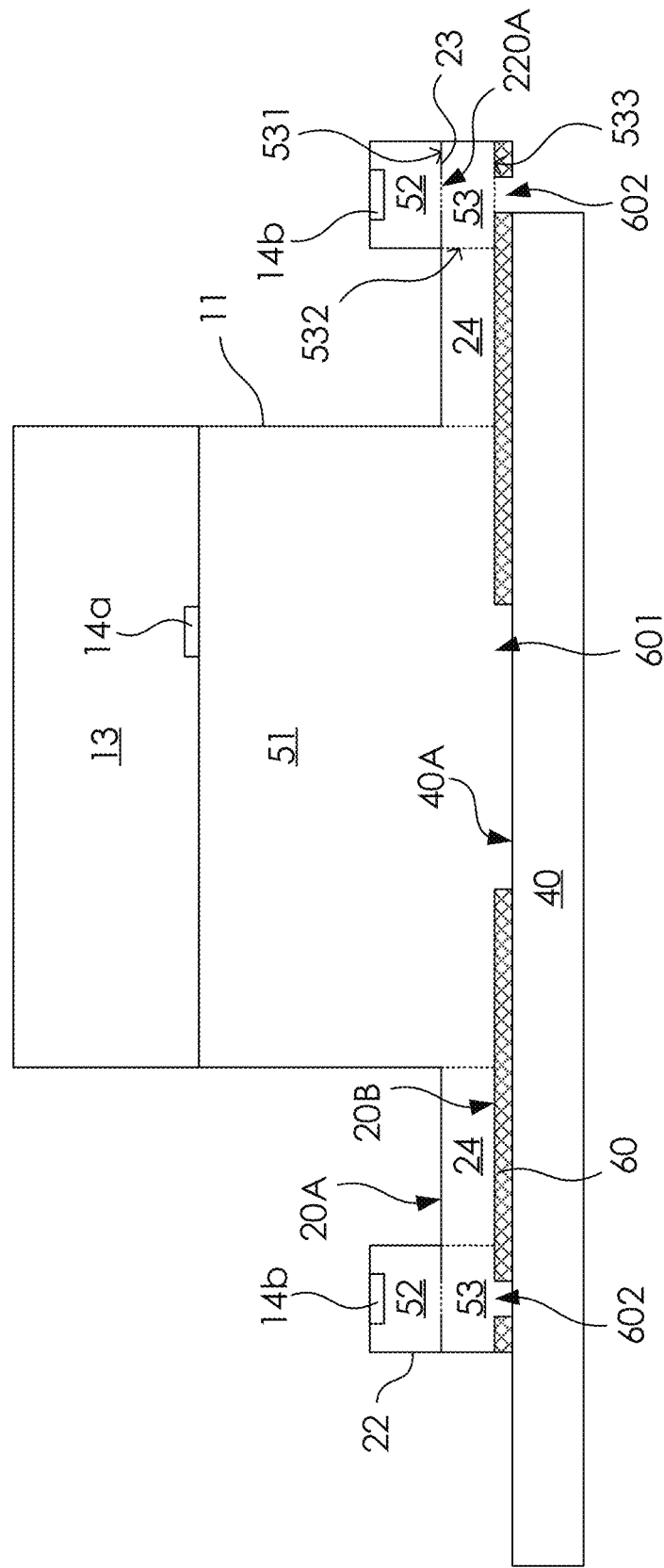
FIG. 7A is a cross-sectional schematic diagram showing correspondence between a first space, a second space and a third space, and technical features of the position of a connecting passage, according to some embodiments of the present invention.
Figure 7B:
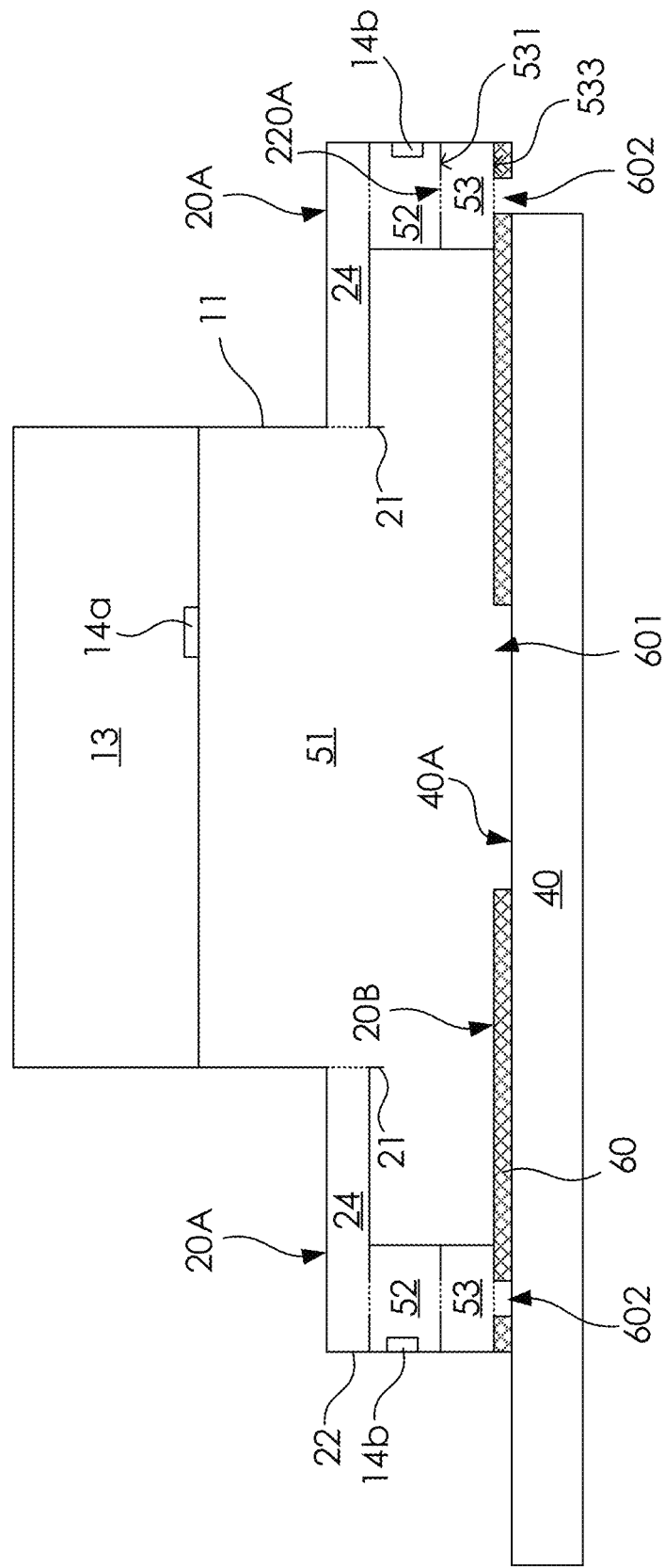
FIG. 7B is a cross-sectional schematic diagram showing correspondence between a first space, a second space and a third space, and technical features of the position of a connecting passage, according to some embodiments of the present invention.
Figure 7C:
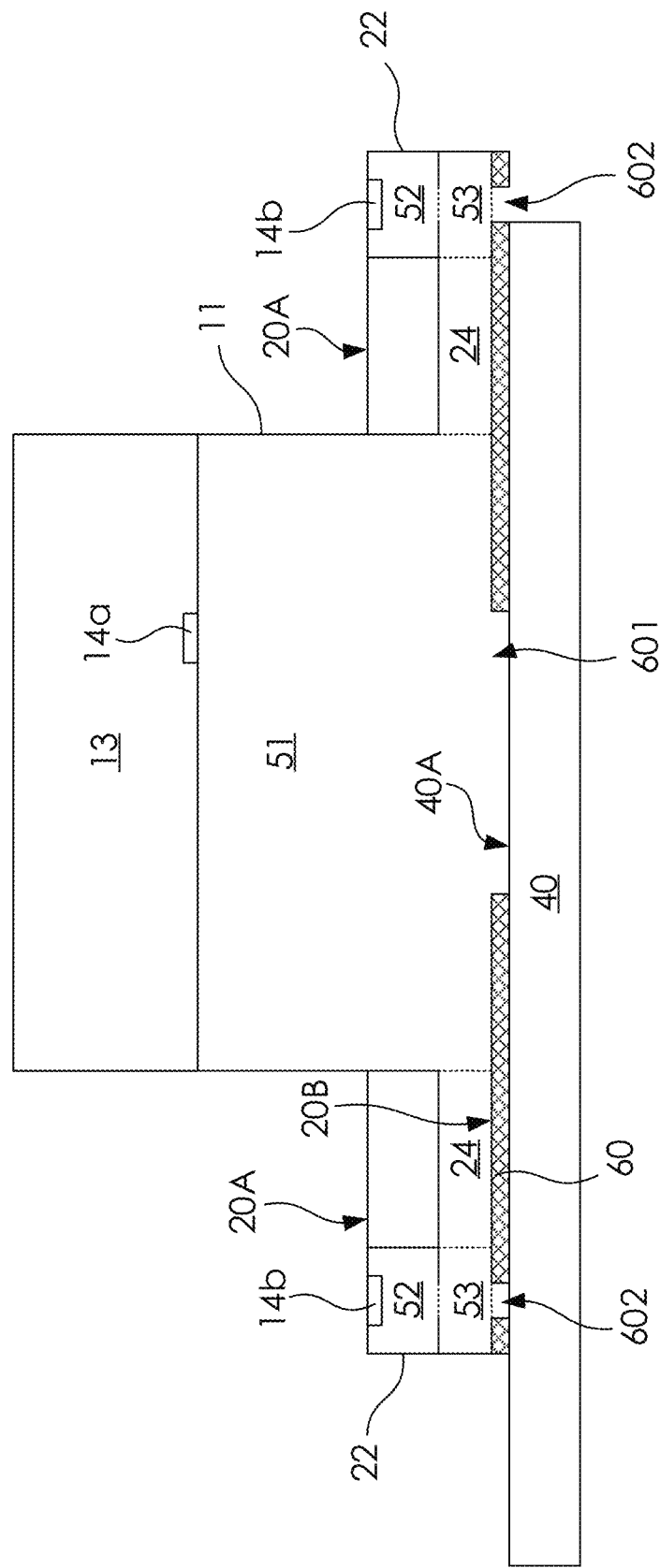
FIG. 7C is a cross-sectional schematic diagram showing correspondence between a first space, a second space and a third space, and showing that the second suction disk wall can be configured in a way that it does not protrude from the first surface of the suction disk, according to some embodiments of the present invention.

Referring to FIG. 6 and a cross-sectional schematic diagram of FIG. 7A illustrating the correspondence among the first space 51, the second space 52 and the third space 53. In some embodiments, the cleaning fabric 60 is arranged between the suction disk 20 and the panel 40. Furthermore, in the present embodiment, the first cleaning fabric opening 601, which is arranged at the center of the cleaning fabric 60, is in communication with the first suction disk through hole (for example, the first suction disk opening 210A as shown in FIG. 1) of the suction disk 20, allowing the negative pressure of the first space 51 to reach the first cleaning fabric opening 601, which may aid in maintaining the attraction the self-propelled device to the panel 40. Moreover, the second cleaning fabric opening 602, which is arranged on the edge of the cleaning fabric 60, is in communication with the second suction disk opening 220A of the suction disk 20, enabling air to flow in the second space 52, the third space 53 and the external environment. As a result, the air pressure sensor 14b in the second space 52 can detects a noticeable change of the negative pressure value in the second space 52 in real time, so as to promptly and properly adjust the location of the self-propelled device.

As shown in FIG. 7A, the third space 53 on the right is illustrated as an example (the structures on both sides of the self-propelled device shown in FIG. 7A defining the third space 53 are substantially the same, and features of the sides of the third space 53 are selectively labeled to the right-side third space 53 for simplicity). An upper side 531 of the third space 53 faces the second surface 20B of the suction disk 20 and is in communication with the second space 52 via the second suction disk opening 220A. A lateral side 532 of the third space 53 faces the connecting passage 24 and is in communication with the connecting passage 24, and a lower side 533 of the third space 53 faces the cleaning fabric 60. More specifically, during operation of the self-propelled device according to an embodiment of the present invention, since the second surface 20B of the suction disk 20 is adjacent to the panel surface 40A of the panel 40 to clean the panel surface 40A with the cleaning fabric 60, the trench 23 is covered by the cleaning fabric 60. However, when part of the self-propelled device goes beyond the panel surface 40A, the third space 53 may be exposed to outside of the panel surface 40A through the second cleaning fabric opening 602 of the cleaning fabric 60, thereby causing the third space 53 to be in communication with air of the external environment.

Further, the condition of the lower side 533 of the third space 53 being exposed to the external environment through the second cleaning fabric opening 602 of the cleaning fabric 60 impacts status of the negative pressure in the first space 51 and the second space 52. More specifically, when the third space 53 is in communication with air of the external environment and is not shielded by the panel 40, air can freely flow into the third space 53 via the second cleaning fabric opening 602 of the cleaning fabric 60. As a result, air leaks from both the second space 52, in communication with the third space 53, and the first space 51, in communication with the third space 53 via the connecting passage 24, and hence compromises the performance of the negative pressure through air extraction by the air extraction module 13 and decreases the suction force of the self-propelled device on the panel 40. However, as described previously, the area of the cross section area of the connecting passage 24 is specifically designed in some embodiments of the present invention to increase the time delay between the pressure drop occurring in the second space 52 and the pressure drop occurring in the first space 51; that is, before the negative pressure of the first space 51 is substantially lowered (for example, before an air pressure sensor 14a disposed near the air extraction module 13 detects a change of the negative pressure value in the first space 51), an air pressure sensor 14b monitoring the air pressure in the second space 52 detects a noticeable change of the negative pressure value in the second space 52). Therefore, the real-time reactions can be performed earlier, and preferably, the real-time reactions are performed before the change of the negative pressure value of the first space 51 is also detected.

In an embodiment, the third space 53 is so configured that the third space 53 is in communication with the second space 52 (preferably via the second suction disk opening 220A). Further, the third space 53 is in communication with the first space 51 via the connecting passage 24 and, when the edge of the self-propelled device goes beyond the panel surface 40A, the second space 52 is in communication with the external environment via the third space 53 instead of via the connecting passage 24, and the first space 51 is in communication with the external environment via the connecting passage 24 and the third space 53 instead of via the second space 52. In an embodiment, the second space 52 is located on a first side of the third space 53, where a second side of the third space 53 is adjacent to the external environment, the first side of the third space 53 is opposite to the second side thereof, the connecting passage 24 is in communication with the third side of the third space 53, and the third side is located between the first side and the second side. In some embodiments, a volume sum of the second space 52, the connecting passage 24 and the third space 53 is less than the volume of the first space 51.

Moreover, the present invention is not limited to the configuration of the position of the connecting passage 24. As shown in FIG. 7B, in some embodiments, the connecting passage 24 can be made to be near the first surface 20A of the suction disk 20, which is similar to the embodiment shown in FIG. 6; for example, a channel having a width of about 1 mm to about 10 mm and a height of about 1 mm to about 4 mm and being in communication with the sidewall of the first suction disk wall 21 is provided on the sidewall of the second suction disk wall 22. In the embodiment shown in FIG. 7B, the connecting passage 24 is adjacent to the first surface 20A of the suction disk 20 and is not adjacent to the second surface 20B, and therefore the cleaning fabric 60 is not required to be part of the sidewall of the passage. In some embodiments, the air pressure sensor 14*b* is disposed on the sidewall of the second suction disk wall 22. In some embodiments, the third space 53 is not in direct communication with the connecting passage 24, and only the upper side 531 of the third space 53 is in communication with the second space 52 via the second suction disk opening 220A and the lower side 533 of the third space 53 is in communication with air of the external environment via the second cleaning fabric opening 602 of the cleaning fabric 60 when part of the self-propelled device goes beyond the panel surface 40A. In some embodiments, the trench 23 is omitted such that the third space 53 is also omitted.

In some embodiments, as shown in FIGS. 7B and 7C, the second suction disk wall 22 can also be formed as non-protruding from the first surface 20A of the suction disk 20.

Figure 7D:
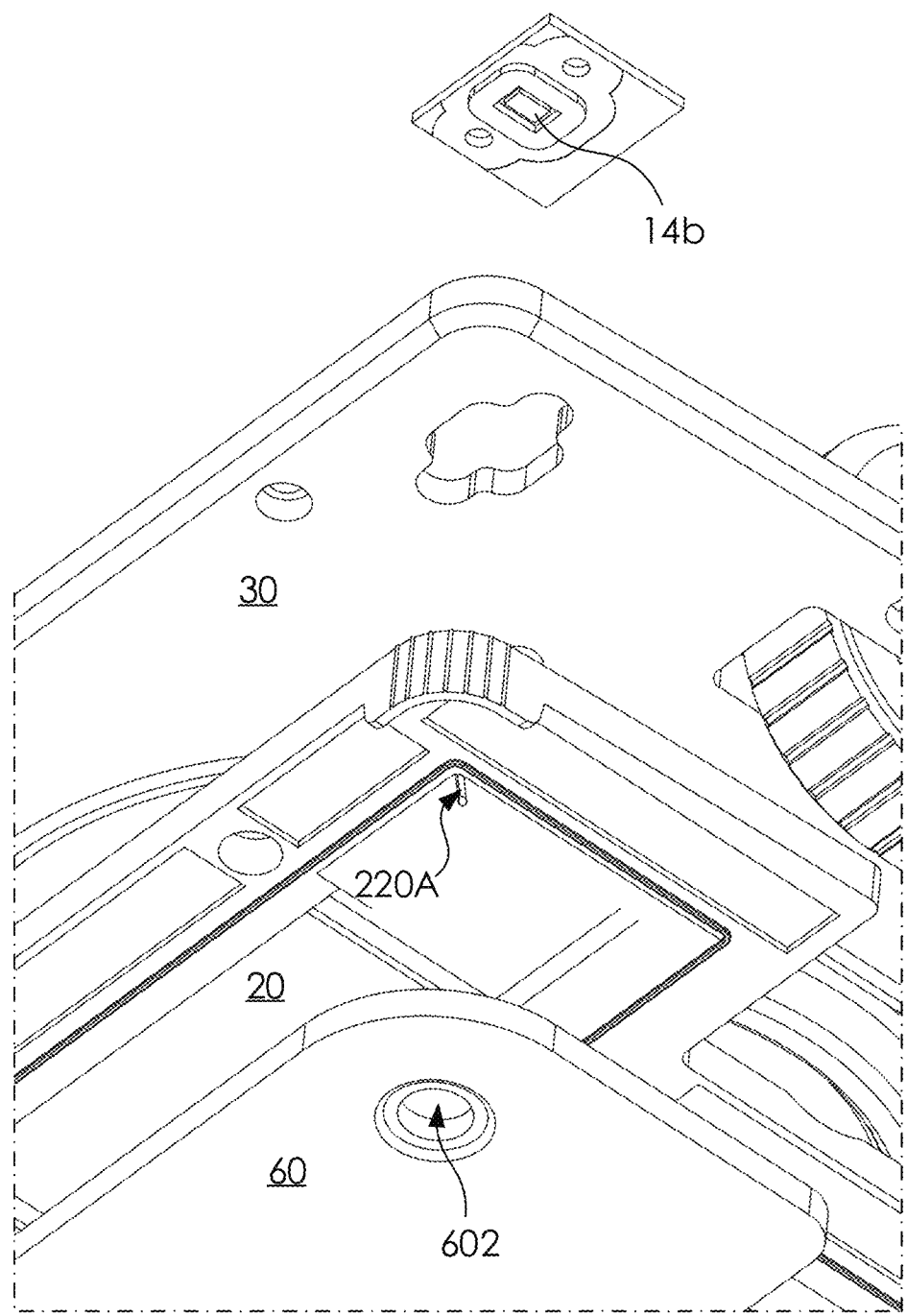
FIG. 7D is a partial enlarged three-dimensional diagram of a suction disk in which a second space is in direct communication with a first space according to an embodiment of the present invention.
Figure 7E:
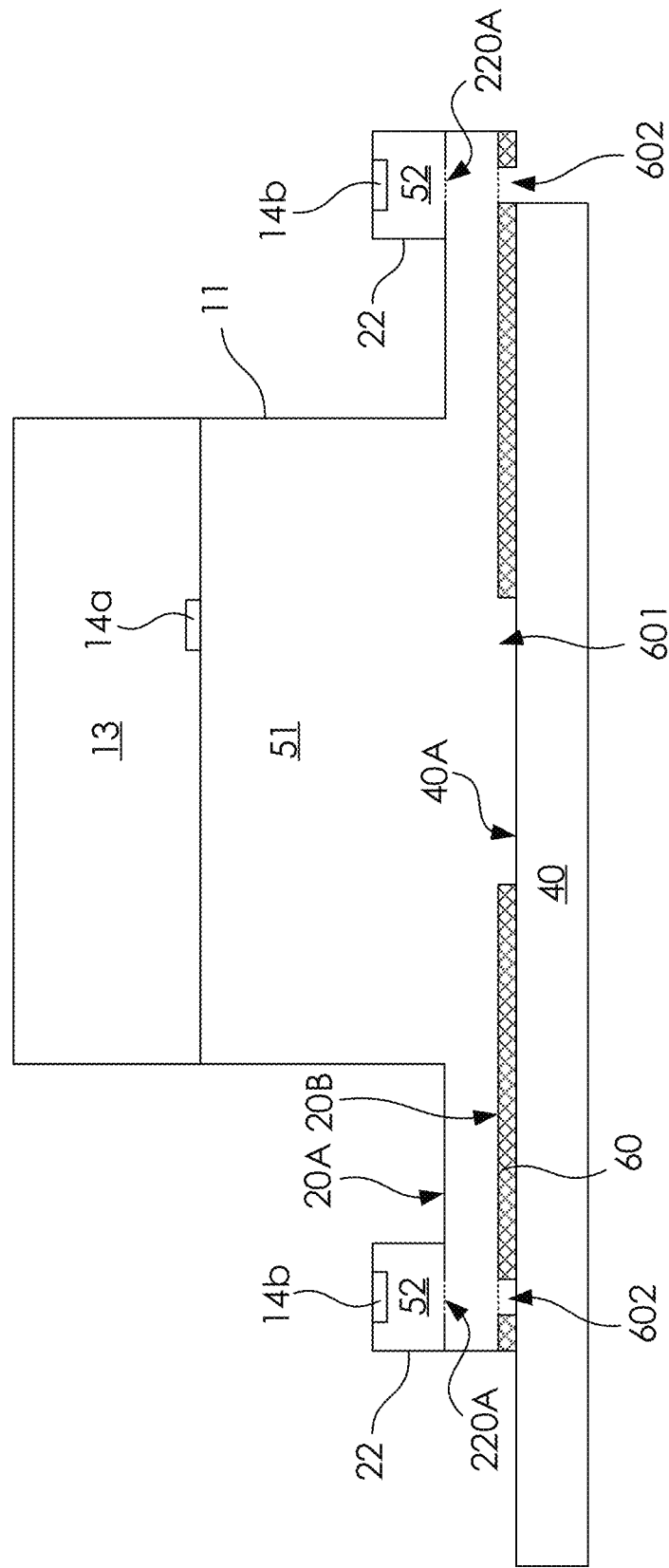
FIG. 7E is a cross-sectional schematic diagram of a second space in direct communication with a first space according to an embodiment of the present invention.
Figure 8A:
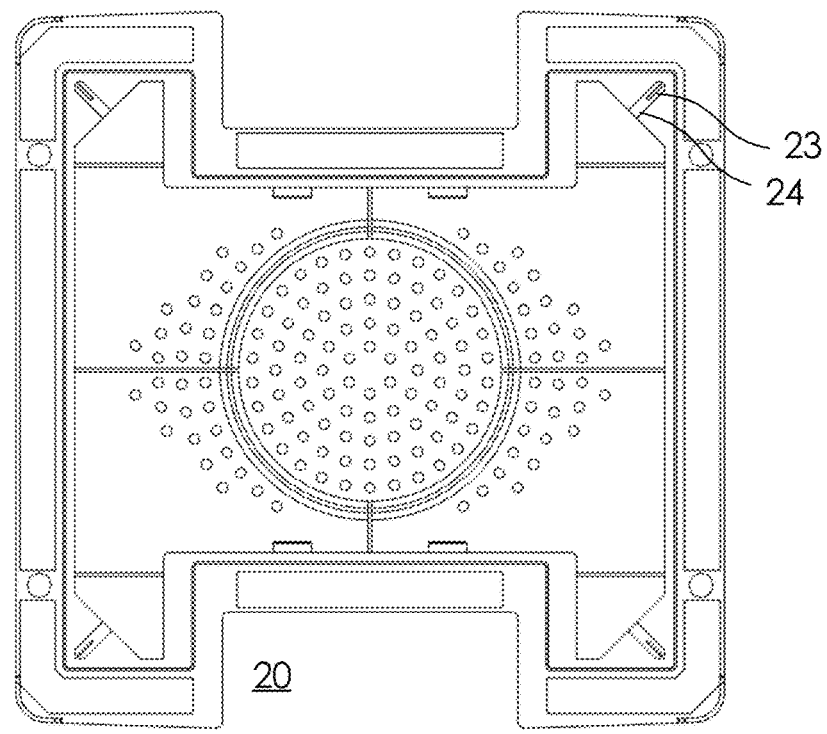
FIG. 8A is a bottom view of a suction disk according to some embodiments of the present invention.
Figure 8B:
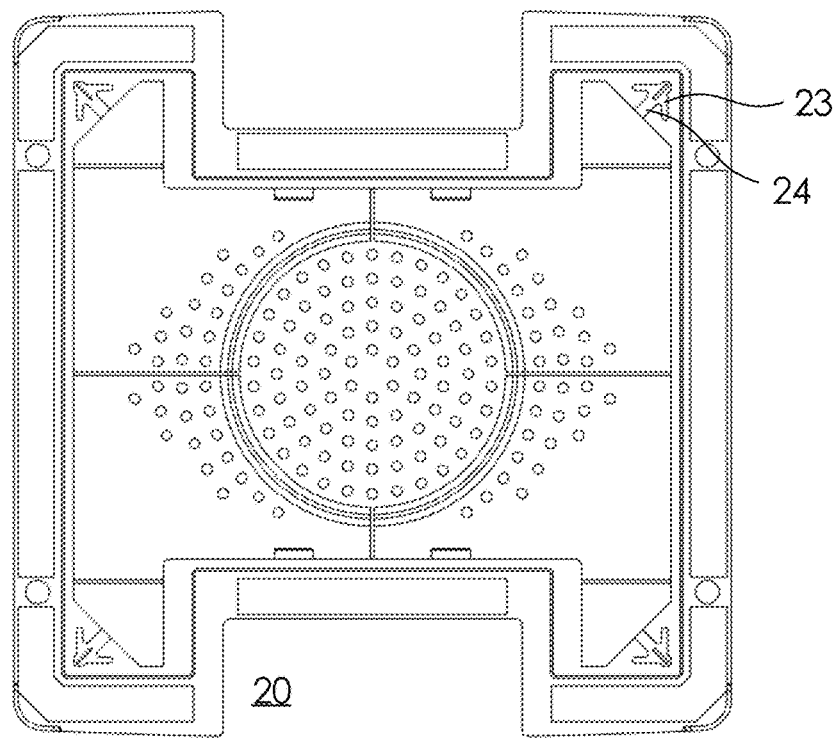
FIG. 8B is a bottom view of a suction disk according to some embodiments of the present invention.

FIGS. 7D and 7E show a partial enlarged three-dimensional diagram and a cross-sectional schematic diagram of the suction disk according to an embodiment of the present invention in which the second space is directly in communication with the first space. As shown in the drawings, in an embodiment, the third space 53 or the connecting passage 24 discussed in the preceding embodiments can also be omitted; for example, no trench 23 or connecting passage 24 is provided around the second suction disk opening 220A. In this connection, because the volume of the second space 52 is less than the volume of the first space 51, the time when the air pressure sensor 14*b* detects the change of the negative pressure value in the second space 52 is earlier than the time when the air pressure sensor 14*a* detects the change of the negative pressure value in the first space 51, and therefore real-time reactions can also be performed earlier. However, as shown in the embodiments of FIG. 7A, 7B or 7C in which the connecting passage 24 (or the third space 53) are present, the time difference between the time when the air pressure sensor 14*b* detects the change of the negative pressure value in the second space 52 and the time when the air pressure sensor 14*a* detects the change of the negative pressure value in the first space 51 is relatively greater, which is a preferred embodiment. From the bottom views of the suction disk 20 shown in FIGS. 8A and 8B, in some embodiments, the trench 23 or a combination of the trench 23 and the connecting passage 24 can have a linear shape and a three-prong shape.

The description above simply describes structures of some embodiments to enable persons skilled in the art to better understand various aspects of the present disclosure. Persons skilled in the art should understand that, the present disclosure can be easily used as the basis for designing or modifying other manufacturing processes and structures for implementing the same purpose and/or achieving the same advantages of the embodiments described in the description. Moreover, persons skilled in the art should acknowledge that, without departing from the spirit and scope of the present disclosure, various changes, substitutions and modifications can be made as equivalent structures also to be encompassed within the spirit and scope of the present disclosure.

What is claimed is:

1. A self-propelled device, comprising:
a body defining a first space, a second space and a third space, wherein the third space is in communication with the first space, and the second space is in communication with the first space via the third space, wherein a volume of the second space is less than a volume of the first space and the second space is closer to an edge of the body than the first space;
a moving module adjacent to the body;
an air extraction module disposed on the body and being in communication with the first space; and
an air pressure sensor disposed on a side of the second space,
wherein the self-propelled device is configured to move on a panel surface,
wherein the second space is in communication with the panel surface through an opening of the second space,
wherein the body comprises a connecting passage, the third space is in communication with the first space via the connecting passage, and the second space is in communication with the first space via the connecting passage and the third space,
wherein when an edge of the self-propelled device extends beyond a border of the panel surface, then the second space is in communication with an external environment via the third space, and the first space is in communication with the external environment via the connecting passage and the third space.

2. The self-propelled device according to claim 1, wherein the second space is disposed between the air pressure sensor and the panel surface.

3. The self-propelled device according to claim 1, wherein a volume sum of the second space, the connecting passage and the third space is less than a volume of the first space.

4. A self-propelled device, comprising:
a body defining a first space and a plurality of second spaces in communication with the first space, wherein each of the second spaces is closer to an edge of the body than the first space is, wherein the body further comprises:
a carrier board adjacent to an upper part of the body and comprising a first carrier board through hole; and
a suction disk adjacent to a lower part of the body and connected to the carrier board, wherein the suction disk comprises a first suction disk through hole corresponding to the first carrier board through hole, wherein the first suction disk through hole and the first carrier board through hole define the first space, and
a plurality of connecting passages, wherein the second spaces are in communication with the first space via the respective connecting passages, and a volume sum of one the second space and one of the connecting passage is less than a volume of the first space;
a moving module adjacent to the body;
an air extraction module disposed on the body and being in communication with the first space;
a plurality of air pressure sensors configured to measure an air pressure of the second spaces; and
a cleaning fabric below the suction disk and configured to contact a panel surface,
wherein the self-propelled device is configured to move on the panel surface.

5. The self-propelled device according to claim 4, wherein the carrier board comprises a carrier board wall encircling the first carrier board through hole, and the suction disk further comprises a first suction disk wall encircling the first suction disk through hole, and the carrier board wall and the first suction disk wall are configured to fit relative to each other such that the carrier board wall is operable to move relative to the first suction disk wall.

6. The self-propelled device according to claim 5, wherein the carrier board further comprises a second carrier board through hole, wherein the suction disk further comprises a second suction disk wall and a second suction disk through hole, the second suction disk wall encircles the second suction disk through hole, the second suction disk through hole comprises a second suction disk opening extending through the suction disk, the second suction disk wall extends through the second carrier board through hole, the air pressure sensors are disposed on a substrate, and the second suction disk wall is sealed by the substrate to form the second spaces.

7. The self-propelled device according to claim 6, wherein the cleaning fabric has a plurality of cleaning fabric openings respectively disposed below the first suction disk through hole and the second suction disk through hole.

8. The self-propelled device according to claim 7, wherein the connecting passages are disposed on a lower surface of the suction disk, wherein the second suction disk through hole is in communication with the corresponding connecting passage.

9. The self-propelled device according to claim 8, wherein the first space further comprises a recessed region on the lower surface of the suction disk, wherein one end of each of the connecting passages is connected to the recessed region, and a bottom of each of the connecting passages is separated from a bottom of the recessed region by a vertical distance.

10. The self-propelled device according to claim 8, wherein the body further comprises a third space in communication with the corresponding second space, wherein an upper side of the third space faces the lower surface of the suction disk and is in communication with the corresponding second space via the second suction disk opening, a lateral side of the third space faces the connecting passage and is in communication with the corresponding connecting passage, and a lower side of the third space faces the cleaning fabric and is exposed through the cleaning fabric openings when part of the self-propelled device goes beyond a border of the panel surface, and a volume sum of one of the second spaces, one of the connecting passages and the third space is less than a volume of the first space.

11. A self-propelled device, comprising:
a suction disk, comprising:
a first suction disk wall disposed at a center of the suction disk and defining a first suction disk through hole;
a plurality of second suction disk walls adjacent to edges of the suction disk, wherein the second suction disk walls respectively define a plurality of second suction disk through holes; and
a plurality of connecting passages disposed on the suction disk and in communication with the first suction disk through hole and the second suction disk through holes;
a carrier board, disposed on the suction disk, comprising:
a carrier board wall disposed at the center of the carrier board and defining a first carrier board through hole; and
a plurality of second carrier board through holes adjacent to edges of the carrier board, wherein the second suction disk walls extend through the second carrier board through holes;
a moving module adjacent to the suction disk;
a plurality of air pressure sensors disposed on a substrate, the substrate being disposed on the carrier board and covering the second suction disk walls; and
an air extraction module disposed on the carrier board wall of the carrier board,
wherein the self-propelled device is configured to move on a panel surface.

12. The self-propelled device according to claim 11, further comprising:
a first space comprising an internal space defined by the carrier board wall and the first suction disk wall when the carrier board wall and the first suction disk wall fit relative to each other; and
second spaces each comprising an internal space defined by the respective second suction disk walls, the second spaces being in communication with the first space via the respective connecting passages, wherein the air pressure sensors are configured to measure an air pressure of the second spaces,
wherein a volume sum of one of the second spaces and one the connecting passages is less than a volume of the first space.

13. The self-propelled device according to claim 11, wherein one end of one of the connecting passages is connected to a recessed region on a bottom surface of the suction disk, and the other end of the one of the connecting passages is connected to a second suction disk opening of the second suction disk through hole.

14. The self-propelled device according to claim 13, wherein the suction disk comprises a first surface and a second surface corresponding to the first surface, wherein the first suction disk wall and the second suction disk walls protrude from the first surface, and a height of the second suction disk walls is greater than a height of the first suction disk wall.

15. The self-propelled device according to claim 14, further comprising a cleaning fabric attached to the second surface of the suction disk and configured to contact the panel surface, wherein the second surface of the suction disk comprises a plurality of shallow grooves where hook and loop fasteners are arranged for attachment of the cleaning fabric.

16. The self-propelled device according to claim 15, wherein the suction disk further comprises a plurality of trenches, the trenches are adjacent to an edge of the suction disk, and the second suction disk opening is disposed on a bottom of the trenches.

17. The self-propelled device according to claim 16, wherein each of the trenches comprises a plurality of branches, and the branches extend in at least two non-parallel directions on the second surface of the suction disk.

18. The self-propelled device according to claim 16, wherein the cleaning fabric comprises a plurality of cleaning fabric openings, and the cleaning fabric openings overlap the trenches in a vertical direction.

19. The self-propelled device according to claim 14, wherein each of the connecting passages is adjacent to the first surface of the suction disk, and one end of one of the connecting passages is connected to a sidewall of the first suction disk wall and the other end of the one of the connecting passages is connected to a sidewall of one of the second suction disk walls.

\* \* \* \* \*